Aug. 11, 1925.
P. F. VOKAL
THREAD GAUGE
Filed Sept. 26, 1923
1,549,635
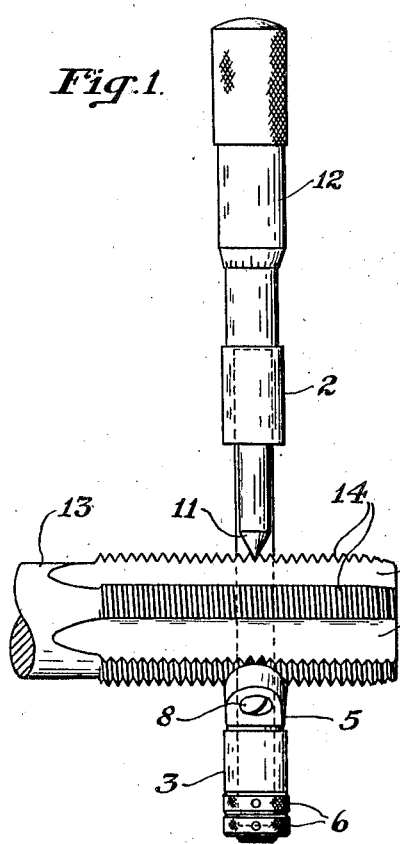
Fig.1.
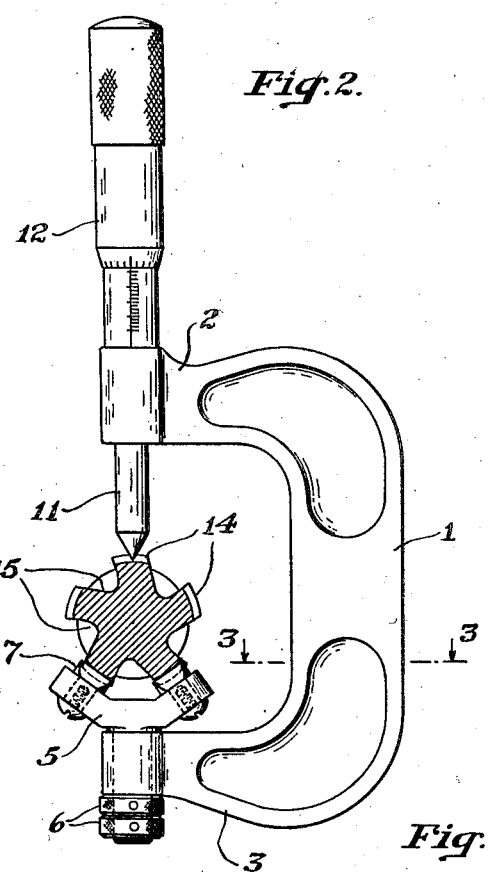
Fig.2.
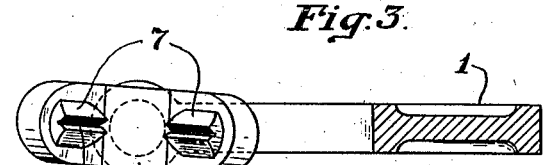
Fig.3.
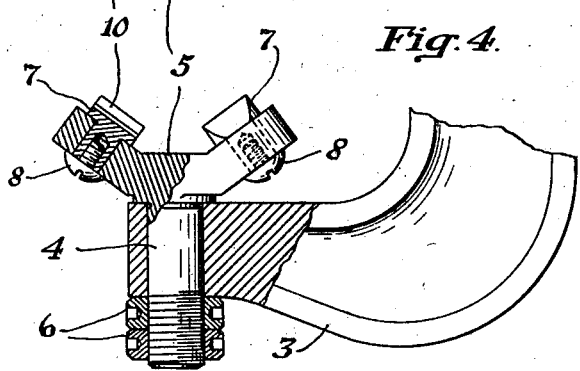
Fig.4.
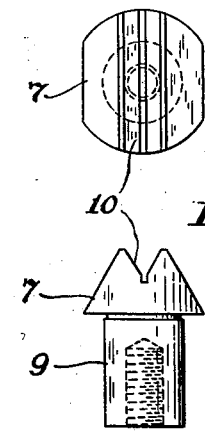
Fig.5.
Fig.6.
INVENTOR
P. F. Vokal.
BY
ATTORNEY Patented Aug. 11, 1925.

1,549,635

UNITED STATES PATENT OFFICE.

PAUL F. VOKAL, OF HARTFORD, CONNECTICUT, ASSIGNOR TO PRATT & WHITNEY COMPANY, OF NEW YORK, N. Y., A CORPORATION OF NEW JERSEY.

THREAD GAUGE.

Application filed September 26, 1923. Serial No. 664,921.

*To all whom it may concern:*

Be it known that I, PAUL F. VOKAL, a citizen of the United States, residing at Hartford, in the county of Hartford and State of Connecticut, have invented certain new and useful Improvements in Thread Gauges, of which the following is a specification.

This invention relates to gauges and particularly to a thread gauge for measuring the pitch diameter of threading taps. Such a tap ordinarily comprises a plurality of spaced thread cutting lands therearound, as shown in the accompanying drawing. It is of course essential that the pitch diameter of these taps shall be accurate within certain limits and it is the primary object of this invention to provide a gauge particularly adapted to measure such diameter.

It is a further object of the invention to provide a U-shaped gauge having a pair of anvils on one arm thereof for engaging the threads on two adjacent lands of a tap and a cooperating micrometer-operated thread engaging element on the other arm for engaging the threads on a land opposite the said two adjacent lands, the said anvils and their supporting element preferably being loosely mounted whereby to freely adjust themselves to the threads being gauged.

With the above and other objects in view, my invention consists in the features of construction and operation set forth in the following specification and illustrated in the accompanying drawing. In such drawing annexed hereto and forming a part of this specification, I have shown one embodiment of my invention but it will be understood that the invention can be otherwise embodied and that the drawing is not to be construed as defining or limiting the scope of the invention, the claims appended to this specification being relied upon for that purpose.

Referring to the figures of the drawing:

Figure 1 is a front elevation of a gauge comprising my invention, the same being illustrated as in gauging contact with a tap to be gauged.

Fig. 2 is a side elevation thereof.

Fig. 3 is an enlarged view of the gauge taken on line 3—3 of Fig. 2.

Fig. 4 is a fragmentary side elevation of Fig. 3, partially in section.

Fig. 5 is an enlarged plan view of one of the thread engaging anvils.

Fig. 6 is a side elevation thereof.

Referring more specifically to the drawing by reference characters, 1 indicates the frame or body portion of the gauge which, as illustrated, is of U-shaped form and provided with arms 2 and 3. Mounted within a bore in the arm 3 is the shank 4 of an anvil supporting element 5, check nuts 6 being provided for holding the same therein. A thread engaging anvil 7 is mounted on each of two diverging arms of the element 5, a screw 8 being threaded into the shank 9 of each anvil for holding the same therein. The thread engaging portion 10 of each anvil is grooved and formed to the shape of the thread to be gauged.

It will be understood that to accurately measure the diameter of a threaded member, the thread engaging anvils of the gauge must closely and accurately fit the threads of such member. It will be noted that the element 5 is supported on a shank 4 and each anvil 7 is supported on a shank 9. The check nuts 6 and screws 8 are so adjusted to these shanks and their supports that the shanks are quite free to rotate. By thus swivelly mounting these elements, the same readily and accurately adjust themselves to the thread being gauged, particularly to the spiral angularity of such thread. The anvils and their supports therefore require no adjustment whatever may be the spiral angularity or pitch of the threads being gauged. The operator has therefore only to engage the anvils 7 with the threads since the former automatically and accurately adjust themselves to the latter.

Within the arm 2 is mounted a thread engaging element 11 adjustable axially preferably by the usual micrometer mechanism 12. As illustrated in the drawing, the axes of the element 11 and shank 4 are coaxial and the element 11 is adapted to cooperate with the anvils 7 and engage a thread substantially opposite such anvils, as shown in the accompanying drawing.

In Figs. 1 and 2 of the drawing, the gauge is shown in gauging contact with a tap 13. The tap illustrated has five threaded lands 14 separated by longitudinal grooves 15. In the gauging operation, the gauge may be slid over the tap with the anvils 7 and element 11 extending into grooves 15. The gauge may thereafter be rotated to engage such elements with the threads of the tap as shown in Figs. 1 and 2, the anvils 7 automatically adjusting themselves to the threads as above described. With the parts in such position, the operator can very quickly and accurately determine the thread accuracy of the tap by adjusting and reading the micrometer 12. It should be particularly noted that the gauging elements are so located as to have full engagement with the threads on the lands and to form a three point contact therewith.

What I claim is:

1. A thread gauge for measuring fluted taps comprising in combination, a frame, a shanked member having two adjacent thread engaging anvils thereon, the shank being seated in the frame and the said anvils being adapted to engage the threads on adjacent lands of a tap, and an adjustable thread engaging element on the frame adapted to engage the threads on a land opposite the said two adjacent lands.

2. A thread gauge for measuring fluted taps comprising in combination, a U-shaped frame, a pair of anvils on one arm of the frame adapted respectively to engage the threads on two adjacent lands of a tap, the anvils being loosely mounted whereby to freely adjust themselves to the thread being gauged, and an adjustable thread engaging element on the other arm for cooperating with the said anvils and engaging the threads on a land opposite the said two adjacent lands.

3. A thread gauge for measuring fluted taps comprising in combination, a U-shaped frame, a shanked member having two adjacent thread engaging anvils thereon, the shank being rotatably mounted in one arm of the frame and the said anvils being adapted to engage the threads on adjacent lands of a tap, an adjustable thread engaging element on the frame adapted to engage the threads on a land opposite the said two adjacent lands, and micrometer means for adjusting the said adjustable element axially.

4. A thread gauge for measuring fluted taps comprising in combination, a frame, a shanked member having two adjacent thread engaging anvils rotatably mounted therein, the shank being seated in the frame and the said anvils being adapted to engage the threads on adjacent lands of a tap, and an adjustable thread engaging element on the frame adapted to engage the threads on a land opposite to said two adjacent lands, the said anvils and member being freely rotatable in their supports whereby to freely adjust themselves to the thread being gauged.

In testimony whereof, I hereto affix my signature.

PAUL F. VOKAL.